United States Patent
Kimoto

(10) Patent No.: US 8,564,843 B2
(45) Date of Patent: Oct. 22, 2013

(54) IMAGE FORMATION BASED ON MULTIPLE IMAGES

(75) Inventor: Taichiro Kimoto, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 492 days.

(21) Appl. No.: 12/877,643

(22) Filed: Sep. 8, 2010

(65) Prior Publication Data

US 2011/0063686 A1    Mar. 17, 2011

(30) Foreign Application Priority Data

Sep. 11, 2009    (JP) .................................. 2009-211087

(51) Int. Cl.
*H04N 1/00*    (2006.01)

(52) U.S. Cl.
USPC ............................. 358/401; 358/1.1; 358/450

(58) Field of Classification Search
USPC ............ 358/1.1, 1.2, 1.5, 1.9, 1.12, 400, 401, 358/448, 450
See application file for complete search history.

(56) References Cited

U.S. PATENT DOCUMENTS

| 6,084,988 | A * | 7/2000 | Kanno et al. | .................. 382/289 |
| 2002/0040375 | A1 | 4/2002 | Simon et al. | |
| 2005/0140991 | A1* | 6/2005 | Ogiwara et al. | ............... 358/1.2 |

FOREIGN PATENT DOCUMENTS

| JP | 2003-532206 A | 10/2003 |
| JP | 2006339770 A | 12/2006 |
| JP | 2007164778 A | 6/2007 |

OTHER PUBLICATIONS

Japanese Notice of Reasons for Rejection for application No. 2009-211087 mailed Jul. 26, 2011.
Notice of Reasons for Rejection for Japanese application No. 2009-211087 mailed Feb. 7, 2012.
Decision of Final Rejection for corresponding Japanese Patent Application No. 2009-211087 dated Apr. 24, 2012.
Decision for Dismissal of an Amendment for corresponding Japanese Patent Application 2009-211087 dated Apr. 24, 2012.
"Convenient functions of multifunction printer: Making copies of both surface of a card on a single sheet of paper," http://www.sharp-ds.com/14product_info/01copy/c_004.html, downloaded Dec. 24, 2009.

* cited by examiner

*Primary Examiner* — Thomas D Lee
(74) *Attorney, Agent, or Firm* — Banner & Witcoff, Ltd.

(57) ABSTRACT

An image forming apparatus including a scanning unit, an image data synthesizing unit, and a printing unit is described. The scanning unit reads a first image, generates first image data representing the first image, reads a second image and generates second image data representing the second image. The image data synthesizing unit generates, on the basis of the first and second image data, synthesized image data representing a synthesized image of the first and second images arranged in a contact state where a first side which is one of four sides constituting an outer edge of the first image and a second side which is one of four sides constituting an outer edge of the second image are disposed immediately adjacent to each other or in a close state in which these sides are disposed parallel to and close to each other. The printing unit prints the synthesized image.

14 Claims, 6 Drawing Sheets

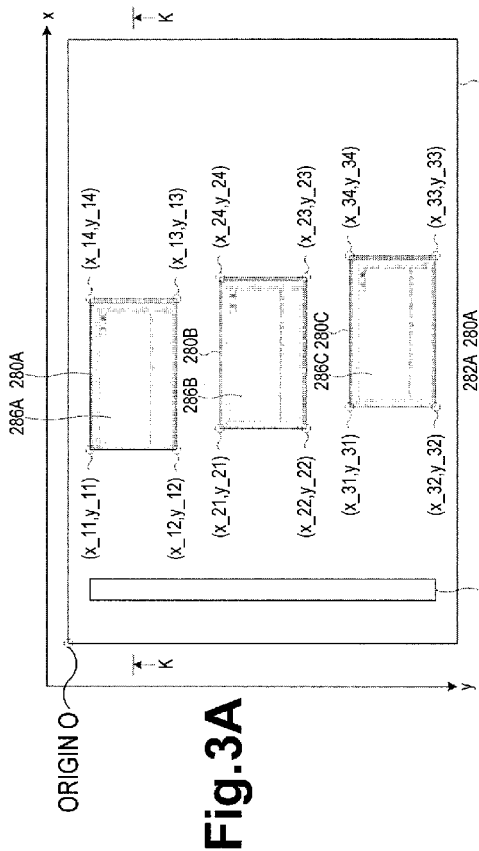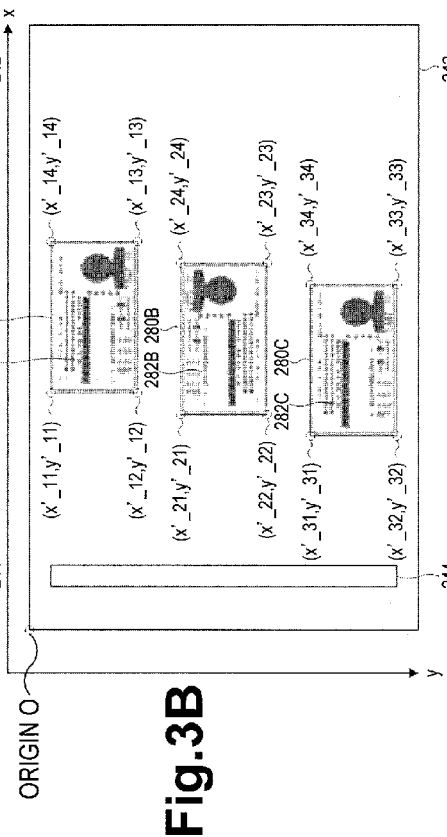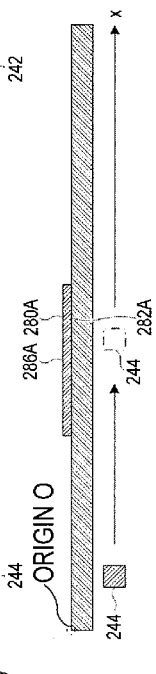

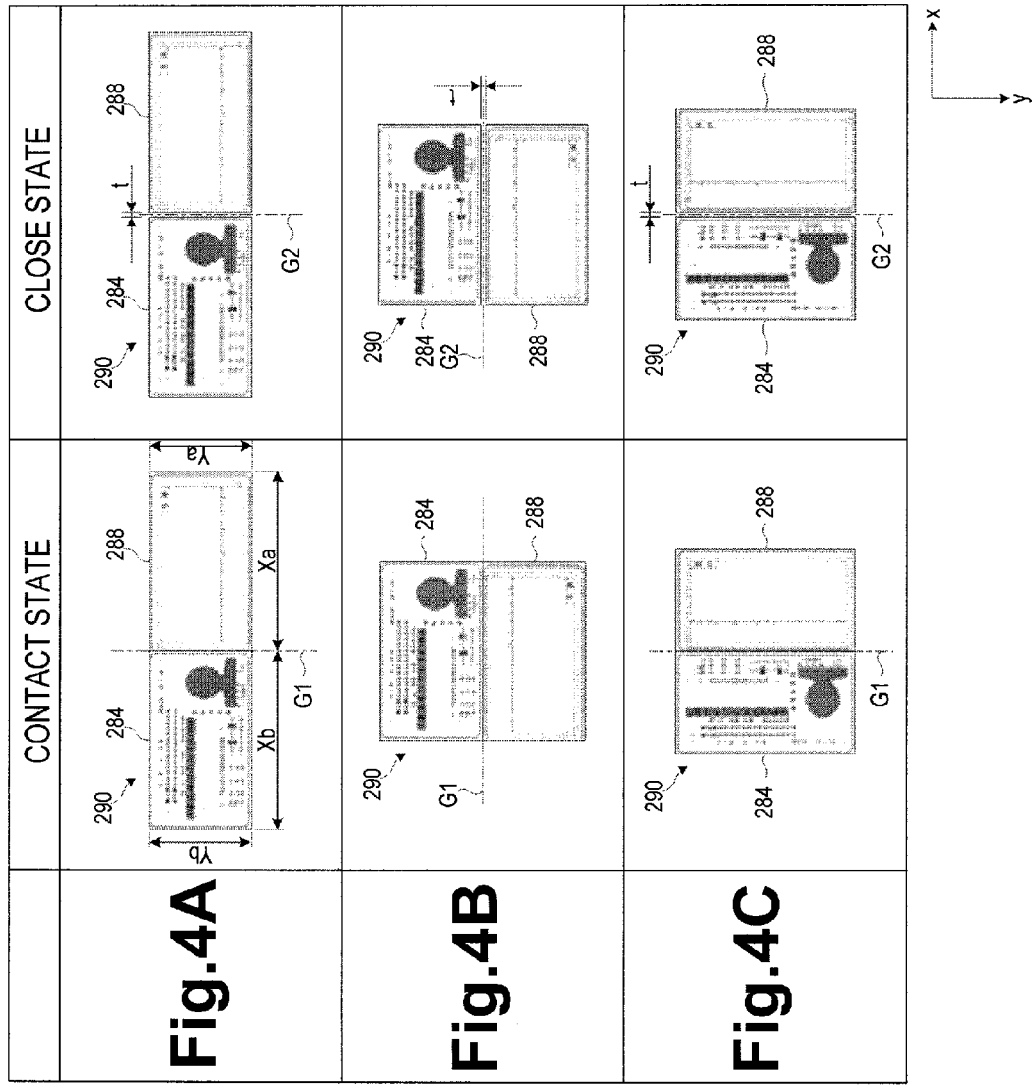

IMAGE FORMATION BASED ON MULTIPLE IMAGES

CROSS REFERENCE TO RELATED APPLICATION

This application claims priority to Japanese Patent Application No. 2009-211087, filed on Sep. 11, 2009, the entire subject matter and disclosure of which is incorporated herein by reference.

BACKGROUND OF THE DISCLOSURE

1. Field of the Disclosure

Aspects relate to image processing of scanned images.

2. Description of the Related Art

Image forming apparatuses with various functions have been proposed. For example, a multifunction peripheral has been known which separately scans front and back surfaces of various cards, such as license cards and time clock cards. The multifunction peripheral makes copies of these surfaces on a single sheet of paper.

In such the multifunction peripheral, two images, i.e., an image on one medium to be read (e.g., an image on a front surface) and an image on another medium to be read (e.g., an image on a back surface), may be printed on a single surface of a recording medium. Such a function of the multifunction peripheral may be advantageous in that it can print (i.e., record) two images on a single surface of a recording medium when a user is asked to present a copy of an ID card, such as a driving license, by a certain organization.

However, when a user wants to use a recording medium having two images printed thereon as a reproduction of a medium to be read, the two images printed with the above-described multifunction peripheral should be cut at outer edges and the cut pieces should be pasted together on their non-printed surfaces.

SUMMARY OF THE DISCLOSURE

One or more aspects of the disclosure relate to an image forming apparatus that can print images in a useful manner when a recording medium having images printed thereon is used as a reproduction of a medium to be read which has images to be printed thereon. Other aspects relate to an image synthesizing process that combines two images into a synthesized image. Yet other aspects relate to a computer program instructions on a computer-readable medium that control the image synthesizing process. Optionally, the computer program can also control the image forming apparatus.

Other objects, features, and advantages of embodiments of the present invention will be apparent to persons of ordinary skill in the art from the following description of embodiments with reference to the accompanying drawings.

BRIEF DESCRIPTION OF THE DRAWINGS

FIGS. 3A and 3B illustrate a state in which original documents are placed on a document table of a scanner section in accordance with one or more aspects.

FIG. 3C is a cross-sectional view taken along line K-K in FIG. 3A in accordance with one or more aspects.

FIGS. 4A, 4B and 4C illustrate synthesized image data representing two images synthesized in a contact state or in a close state in accordance with one or more aspects.

DETAILED DESCRIPTION OF THE EMBODIMENTS

General Overview

According to an embodiment, an image forming apparatus may include a scanning unit configured to read a first image, generate first image data representing the first image, read a second image, and generate second image data representing the second image. The image forming apparatus may include an image data synthesizing unit configured to generate, on the basis of the first and second image data, synthesized image data representing a synthesized image of the first and second images arranged in a contact state where a first side which is one of four sides constituting an outer edge of the first image and a second side which is one of four sides constituting an outer edge of the second image are disposed immediately adjacent to each other or in a close state in which these sides are disposed parallel to and close to each other. The image forming apparatus may include a printing unit configured to prints, on a recording medium, the synthesized image represented by the synthesized image data.

The first and second media to be read may be two physically separated media or may be front and back surfaces of a single medium.

According to another embodiment, further provided is a non-transitory computer readable medium having computer readable instructions for controlling an image forming apparatus which includes a scanning unit for reading an image on a medium to be read and generating image data representing the image and a printing unit for printing a predetermined image represented by predetermined data on a recording medium, the instructions causing the image forming apparatus to perform the step of an image data acquiring in which the scanning unit acquires first image data representing a first image and second image data representing a second image. An image data synthesizing step that generates, on the basis of the first and second image data, synthesized image data representing a synthesized image of the first and second images arranged in a contact state where a first side which is one of four sides constituting an outer edge of the first image and a second side which is one of four sides constituting an outer edge of the second image are disposed immediately adjacent to each other or in a close state in which these sides are disposed parallel to and close to each other. And a print instruction step that instructs the image forming apparatus to print the synthesized image represented by the synthesized image data.

It is noted that various connections are set forth between elements in the following description. It is noted that these connections in general and, unless specified otherwise, may be direct or indirect and that this specification is not intended to be limiting in this respect.

Image Forming System

Figure 1:
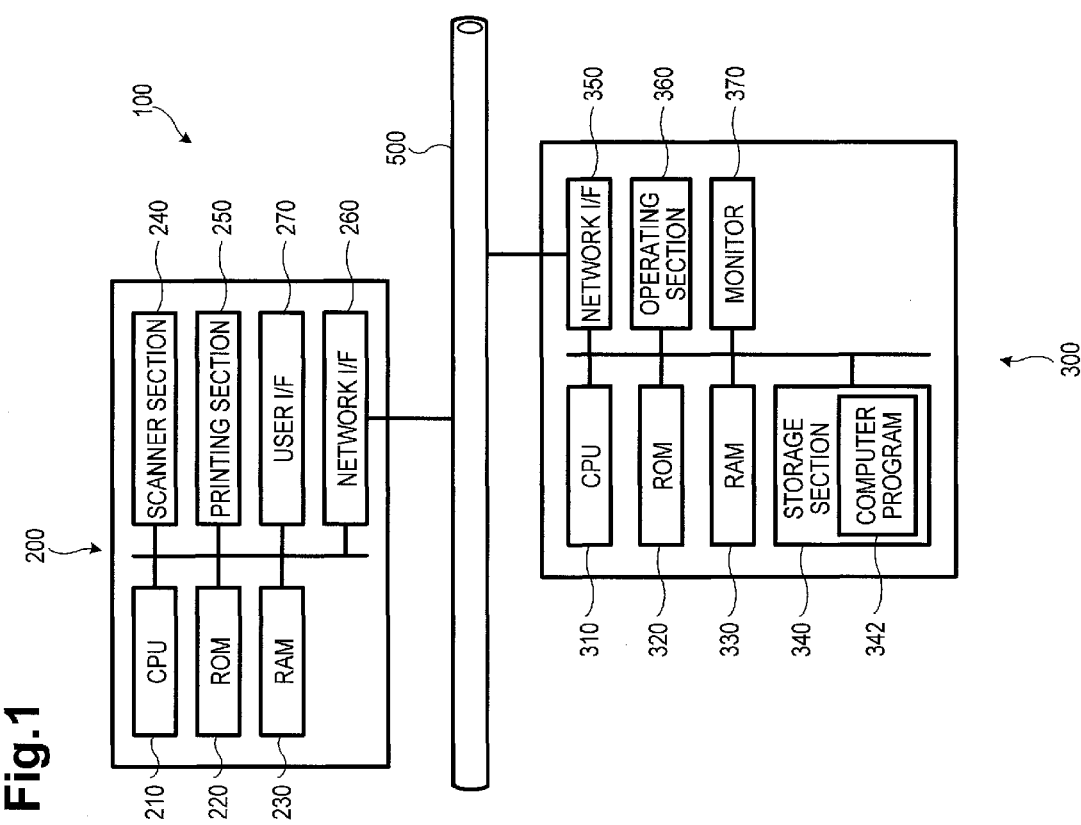
FIG. 1 illustrates a configuration of an image forming system and functional blocks of an image forming apparatus and a computer included in the image forming system in accordance with one or more aspects.

An image forming system 100 will be described with reference to FIG. 1. The image forming system 100 includes an image forming apparatus 200 and a computer 300. The image forming apparatus 200 and the computer 300 are communicatively connected to each other via a network 500, such as a LAN. Connection means between the image forming apparatus 200 and the computer 300 is not limited to the network 500 but may be USB connection. The computer 300 can instruct the image forming apparatus 200 to execute predetermined processes.

The image forming apparatus 200 includes a CPU 210, a ROM 220, a RAM 230, a scanner section 240, a printing section 250, a network interface (network I/F) 260 and a user interface (user I/F) 270. The CPU 210 controls the image forming apparatus 200 to execute, for example, a process of printing a synthesized image which will be described later. The ROM 220 stores programs used for various processes including the process of printing a synthesized image executed by the CPU 210. The RAM 230 functions as a storage area. Various function means are constituted when the CPU 210 executes, on the RAM 230, the programs stored in the ROM 220.

The scanner section 240 includes a document table 242 and a reading sensor 244 (see FIG. 3). An original document 280 to be scanned is placed on the document table 242. The reading sensor 244 reads an image on a first surface (i.e., a medium to be read) of the original document 280 placed on the document table 242. The reading sensor 244 moves in a sub-scanning direction (x direction) (see FIG. 3) when reading an image. Document table 242 is an example of a document positioning device. A document positioning device assists the operation of the reading sensor 244 by positioning the original document 280. In the document table 242 example, the reading sensor 244 moves while the document table 242 remains fixed. Alternatively, the reading sensor 244 may remain at a given location while the document table 242 moves. A document positioning device refers to one or more of the following: document table 242 (moving or fixed) and a drive mechanism (gears, rollers, belts, or a combination thereof) that permits relative movement between the original document and reading sensor 244. For the purposes of explanation, the following description refers to document table 242 to assist in the understanding of various examples. It is appreciated that other examples of the document positioning device may be used in place of the document table 242. In yet further examples, the document positioning device may not be used based on the type of reading sensor 244. For instance, reading sensor 244 may include a hand-held camera or other camera as known in the art where a specific document positioning device as described above is not needed.

The printing section 250 is, for example, an inkjet printing section which prints images by reciprocating a recording head in predetermined directions while conveying a recording sheet (i.e., a recording medium) in a direction perpendicular to the movement of the recording head. An image read by the scanner section 240 may be printed (i.e., a copying function). The network I/F 260 executes communication via the network 500. The image forming apparatus 200 communicates with the computer 300 via, for example, the network I/F 260. The user interface (user I/F) 270 may be constituted by a numeric keypad and a monitor to receive input of user commands and display predetermined information.

The computer 300 is a device equivalent to a conventional personal computer or other computing device (including mobile computing devices). The computer 300 includes a CPU 310, a ROM 320, a RAM 330, a storage section (which is constituted by, for example, a hard disk or a solid state drive (SSD)) 340, a network I/F 350, an operating section (e.g., a keyboard and a mouse) 360 and a monitor 370. The computer program 342 for controlling the image forming apparatus 200 is stored in the storage section 340. Examples of the computer program 342 include a driver program for controlling the image forming apparatus 200.

Various function means are constituted when the CPU 310 executes, on the RAM 230, the computer programs stored in the storage section 340. The computer 300 communicates with the image forming apparatus 200 via the network I/F 350. Details about the computer 300 will be omitted.

Process in Image Forming Apparatus

Hereinafter, a process of printing a synthesized image executed in the image forming apparatus 200 and a process of printing executed in the course of the process of printing a synthesized image will be described. These processes are executed by the CPU 210 of the image forming apparatus 200 executing programs for these processes.

Process of Printing Synthesized Image

The process of printing a synthesized image will be described with reference to FIGS. 2A to 4C. FIGS. 3A and 3B are top views (plan views) of the image forming apparatus 200 and FIG. 3C is a cross-sectional view taken along line K-K in FIG. 3A. The reading sensor 244 illustrated in the two-dot chain line in FIG. 3C is in the course of movement. Xb and Yb in FIG. 4A each represent an image size in x and y directions of image data 284 representing an image on a first surface 282. Xa and Ya each represent an image size in x and y directions of image data 288 representing an image on a second surface 286. Xb, Yb, Xa and Ya do not constitute images themselves represented by the image data 284 and 288.

The process of printing a synthesized image is started upon user input of a start command for the process via the user I/F 270. The user places at least one original document 280 on the document table 242 before the input of the start command. The user places, for example, three original documents 280A, 280B and 280C (hereinafter, referred to as "original document 280" unless each original document should be identified) on the document table 242 along a main scanning direction (y direction) perpendicular to the sub-scanning direction (x direction). Examples of the original document 280 include ID cards, such as a driving license, as illustrated in FIGS. 3A and 3B. The user inputs the size of a recording sheet used in the process of printing (see S136) which will be described later. For example, the user inputs the size of the recording sheet as "A4".

The CPU 210 which started the process initializes variables used for the process of printing a synthesized image (S100). The CPU 210 then causes the scanner section 240 to start scanning (S102). In the scanner section 240, the reading sensor 244 is moved in the sub-scanning direction (x direction) to read an image on the first surface (i.e., a front surface) 282 of the original document 280 disposed on the document table 242 opposing the reading sensor 244 (see FIGS. 3A and 3C). The CPU 210 detects a number (N) of the original document(s) 280 read by the reading sensor 244 and coordinates (i.e., coordinate information) (x, y) of each of the four corners of the original document(s) 280. The CPU 210 generates the image data 284 which represents the image read by the reading sensor 244. In a state illustrated in FIG. 3A, for example, the CPU 210 detects the number "3" of the original documents 280 and coordinates (see the coordinates illustrated in FIG. 3A) of four corners of the original documents 280A, 280B and 280C. The CPU 210 also generates image data 284A, 284B and 284C each representing the images on first surfaces 282A, 282B and 282C of the original documents 280A, 280B and 280C.

After executing S102, the CPU 210 displays a message on the user I/F 270 to encourage the user to turn over the original document 280 placed on the document table 242. The CPU 210 stands by until the user turns over the original document 280 in response to the message and inputs a restart command for the process on the user I/F 270.

After the restart command is input by the user, the CPU 210 causes the scanner section 240 to start scanning (S104). In the scanner section 240, an image on a second surface (i.e., a back surface) 286 of the original document 280 placed on the document table 242 opposing the reading sensor 244 (see FIG. 3B) is read in the same manner as described above. The CPU 210 detects a number (n) of the original document(s) 280 read by the reading sensor 244 and coordinates (i.e., coordinate information) (x', y') of each of the four corners of the original document(s) 280. The CPU 210 generates image data 288 which represents the image read by the reading sensor 244. In a state of FIG. 3, for example, the CPU 210 detects the number "3" of the original documents 280 and coordinates (see coordinates illustrated in FIG. 3B) of the four corners of the original documents 280A, 280B and 280C. The CPU 210 also generates image data 288A, 288B and 288C each representing the images on the second surfaces 286A, 286B and 286C of the original documents 280A, 280B and 280C.

The CPU 210 then executes a character recognition process on the image data 284A, 284B, 284C, 288A, 288B and 288C generated in S102 and S104 and S106 (S106). In order to correct the orientation of the characters, the CPU 210 executes, in S106, a conventional turning upside down process on the image data 284 and 288 whose characters have been recognized upside down. The turning upside down process is a conventional image rotation as known in the art (and is not addressed in further detail here). In an example of FIG. 3B, the original document 280B is placed upside down by the user who turned down the original document 280B after S102 and before S104. The CPU 210 executes the turning upside down process on the image data 288B representing the image on the second surface 286B in order to correct orientation of the characters. In this manner, the image data 288B is converted into image data with the characters of correct orientation. If no image data 284 and 288 which should be subject to the turning upside down process is detected in the character recognition process, the CPU 210 does not execute the turning upside down process.

After executing S106, the CPU 210 executes a process to rearrange the image data 284 and 288 (a rearranging process) (S108). The example illustrated in FIG. 3A in which the original documents 280A, 280B and 280C are arranged out of alignment in the sub-scanning direction (x direction), a reference direction, will be described. When these original documents are read by the reading sensor 244 in this state, the CPU 210 stores, in a first place of a predetermined area of the RAM 230, the image data 284A representing the image on the first surface 282A of the original document 280A detected first. The CPU 210 also stores, in the second place of the image data 284A, the image data 284B representing the image on the first surface 282B detected subsequently. The CPU 210 also stores, in the last place of the image data 284B, the image data 284C representing the image on the first surface 282C detected finally. Similarly, when the original documents 280A, 280B and 280C are placed on the document table 242 as illustrated in FIG. 3B, the CPU 210 stores the image data 288C in the first place of another predetermined area of the RAM 230, stores the image data 288B in the second place and stores the image data 288A in the last place.

In S108, the CPU 210 rearranges the sequence of the image data 284A, 284B and 284C stored in the predetermined area of the RAM 230 and the sequence of the image data 288C, 288B and 288A stored in another predetermined area (reference numerals represent the sequence of storage) in an ascending order on the basis of, for example, values of the coordinate y and y' that is closest to the origin O.

More particularly, in the example with the image data 284A (y_11), 284B (y_21) and 284C (y_31) (see FIG. 3A for y values), the values of y are y_11<y_21<y_31 and thus the image data 284A, 284B and 284C is stored in an ascending order. Accordingly, the image data 284A, 284B and 284C will not be rearranged. On the contrary, in the example with the image data 288C (y'_31), 288B (y'_21) and 288A (y'_11) (see FIG. 3B for y values), the values of y' are y'_31>y'_21>y'_11 and thus the image data 288C and the image data 288A will be rearranged. The image data 288A, 288B and 288C is arranged in this order from the first place of another predetermined storage area.

After executing S108, the CPU 210 compares the number (N) of the original documents 280 acquired in $102 and the number (n) of the original documents 280 acquired in S104. More particularly, the CPU 210 determines whether or not these numbers are in agreement (S110). When it is determined that these numbers are not in agreement (S110: negative), the CPU 210 completes the process of printing a synthesized image. The CPU 210 completes the process because combinations of the image data 284 and 288 cannot be determined appropriately. When, on the other hand, the numbers are in agreement (S110: affirmative), the routine proceeds to S114 (starting within loop limit S112).

In S114, the CPU 210 determines whether the image data 284 stored in the i-th place in the predetermined area of the RAM 230 and the image data 288 stored in the i-th place in another area are substantially in agreement with each other regarding the image sizes in x and y directions. For example, the CPU 210 determines whether or not Xb≈Xa and Yb≈Ya (see FIG. 4A) regarding the image data 284A stored in the first place of the predetermined area of the RAM 230 and the image data 288A stored in the first place of another area. When it is determined that the image sizes are not in agreement in either direction (S114: negative), the routine proceeds to S116. When it is determined that the image sizes are substantially in agreement (S114: affirmative), the routine proceeds to S118.

In the example of FIG. 4, the image data 284 represents an image on a front surface of a driving license and the image data 288 represents an image on a back surface of the driving license. Both the images have the same size and thus the determination result in S114 is affirmative (S114: affirmative). If, for example, the image data 284 represents an image on the front surface of the driving license and the image data 288 represents an image of a passport, the determination result in S114 is negative (S114: negative).

In S116, the CPU 210 executes an enlarging or reducing process in order to make the image size (Xa, Ya) of the image data 288 generated in S104 be in agreement with the image size (Xb, Yb) of the image data 284 generated in S102. In this case, an enlargement and reduction ratio Kx (%) in x direction is Kx=Xb/Xa×100 and an enlargement and reduction ratio Ky (%) in y direction is Ky=Yb/Ya×100. The CPU 210 enlarges or reduces the image data 288 in x direction at the ratio of Kx (%) and in y direction at the ratio of Ky (%). The CPU 210 then converts the image data 288 data of the same image size (Xb, Yb) as that of the image data 284 (Xb, Yb). When S116 is completed, the routine proceeds to S118.

In S118, the CPU 210 compares twice the size of Xb which is the x direction size of the image data 284 and an x direction size of the printing area (PrintSizeX) of an effective printing area (i.e., an area except for a margin) of a recording sheet. The recording sheet has been input by the user before starting of the process of printing a synthesized image. In particular, it is determined whether twice the size Xb is not greater than the x direction size of the printing area of the recording sheet (i.e., whether the x direction size of the printing area of the recording sheet is not smaller than twice the size of Xb). For example, when the user has input the size of the recording sheet as "A4," it is determined whether twice the size of Xb is not greater than the size of the printing area of the 210-mm A4 recording sheet except for the margins in x direction. When twice the size of Xb is not greater than the x direction size of the printing area of the recording sheet (S118: affirmative), the routine proceeds to S120. When twice the size of Xb is greater than the x direction size of the printing area of the recording sheet (S118: negative), the routine proceeds to S124.

In S120, the CPU 210 specifies one y direction side which constitutes an outer edge of the image represented by the image data 284, and one y direction side which constitutes an outer edge of the image represented by the image data 288 as reference sides for image synthesis. The CPU 210 then generates synthesized image data 290 of the image data 284 and the image data 288. In the synthesized image data 290, the image data 284 and the image data 288 are arranged in a contact state in which the specified reference sides are disposed immediately adjacent to each other or in a close state in which the specified reference sides are disposed parallel to and close to each other. In FIG. 4A, the left column illustrates the synthesized image data 290 in the contact state generated in S120 and the right column illustrates the synthesized image data 290 in the close state generated in S120. In their close state, a slight clearance t is provided between both images (see right column of FIG. 4A). In S122, the CPU 210 sets a subrange (SubRange) obtained by adding a margin (margin) of a predetermined size to the y direction size Yb of the image data 284 and 288. The routine then proceeds to S136. The margin represents intervals between the synthesized images disposed (arranged) in the predetermined direction when a plurality of synthesized images are printed on a single recording sheet. The SubRange is used in the process of printing in S136.

In S124, the CPU 210 compares the x direction size Xb of the image data 284 and the x direction size of the printing area of the recording sheet. In particular, the CPU 210 determines whether the size Xb is not greater than the x direction size of the printing area of the recording sheet (i.e., whether the x direction size of the printing area of the recording sheet is not smaller than the size Xb). For example, when the user has input the size of the recording sheet as "A4," it is determined whether the size Xb is not greater than the x direction size of the A4 printing area, i.e., 210 mm, except for the margin in x direction. If the size Xb is not greater than the x direction size of the printing area of the recording sheet (S124: affirmative), the routine proceeds to S126. If, on the other hand, the size Xb is greater than the x direction size of the printing area of the recording sheet (S124: negative), the routine proceeds to S130.

In S126, the CPU 210 rotates either of the image data 284 or 288 by 180 degrees. Regarding the image data 284 and 288, either of which has been rotated, the CPU 210 specifies one x direction side which constitutes an outer edge of the image represented by the image data 284, and one x direction side which constitutes an outer edge of the image represented by the image data 288 as reference sides for image synthesis. The CPU 210 then generates synthesized image data 290 of the image data 284 and the image data 288. In the synthesized image data 290, the image data 284 and the image data 288 are arranged in a contact state in which the specified reference sides are disposed immediately adjacent to each other or in a close state in which the specified reference sides are disposed parallel to and close to each other. In FIG. 4B, the left column illustrates the synthesized image data 290 in the contact state generated in S126 and the right column illustrates the synthesized image data 290 in the close state generated in S126. In their close state, a slight clearance t is provided between both images similarly as illustrated in FIG. 4A (see right column of FIG. 4B). In the state illustrated in FIG. 4B, the image data 288 has been rotated by 180 degrees. In S128, CPU 210 sets the Subrange obtained by adding a margin of a predetermined size to twice the size of the y direction size yb of the rotated image data 284 and 288. The routine then proceeds to S136.

In S130, the CPU 210 compares the x direction size Xb of the image data 284 and the y direction size of the printing area (PrintSizeY) of the effective printing area of the recording sheet. In particular, it is determined whether the size Xb is not greater than the y direction size of the printing area of the recording sheet (i.e., whether the y direction size of the printing area of the recording sheet is not smaller than the size Xb). For example, when the user has input the size of the recording sheet as "A4," it is determined whether the size Xb is not greater than the size of the printing area of the 297-mm A4 recording sheet except for the margins in y direction. When the size Xb is not greater than the y direction size of the printing area of the recording sheet (S130: affirmative), the routine proceeds to S132. When, on the other hand, the size Xb is greater than the y direction size of the printing area of the recording sheet (S130: negative), the process of printing a synthesized image is completed.

In S132, the CPU 210 rotates one of the image data 284 and 288 by 90 degrees counterclockwise and the other by 270 degrees (−90 degrees) clockwise. Regarding the rotated image data 284 and 288, the CPU 210 specifies one y direction side which constitutes an outer edge of the image represented by the image data 284, and one y direction side which constitutes an outer edge of the image represented by the image data 288 as reference sides for image synthesis. The CPU 210 then generates synthesized image data 290 of the image data 284 and the image data 288. In the synthesized image data 290, the image data 284 and the image data 288 are arranged in a contact state in which the specified reference sides are disposed immediately adjacent to each other or in a close state in which the specified reference sides are disposed parallel to and close to each other. In FIG. 4C, the left column illustrates the synthesized image data 290 in the contact state generated in S132 and the right column illustrates the synthesized image data 290 in the close state generated in S132. In their close state, a slight clearance t is provided between both images similarly as illustrated in, for example, FIG. 4A (see right column of FIG. 4C). In the state illustrated in FIG. 4C, the image data 284 has been rotated by 90 degrees counterclockwise and the image data 288 has been rotated by 270 degrees counterclockwise (−90 degrees clockwise). In S134, CPU 210 sets the Subrange obtained by adding a margin of a predetermined size to the x direction size xb of the rotated image data 284 and 288. The routine then proceeds to S136.

In S136, the CPU 210 executes the process of printing on the synthesized image data 290 generated in either S120, S126 or S132. The process of printing will be described in detail later. Here, the CPU 210 executes the processes of S114 to S136 N times corresponding to the number (N) (i.e., n times corresponding to the number (n)) (via loop limit S138 and corresponding loop limit S112) to generate N pieces of synthesized image data 290. If, for example, the image data 284A, 284B and 284C are stored in the predetermined area of the RAM 230 and the image data 288A, 288B and 288C are stored in another predetermined area, the processes of S114 to S136 are executed three times for the combination of the image data 284A and 288A, the combination of the image data 284B and 288B and the combination of the image data 284C and 288C. In this manner, the synthesized image data 290A, 290B and 290C of each combination are generated. After the process is executed N times, the CPU 210 completes the process of printing a synthesized image.

Process of Printing

Figure 5:
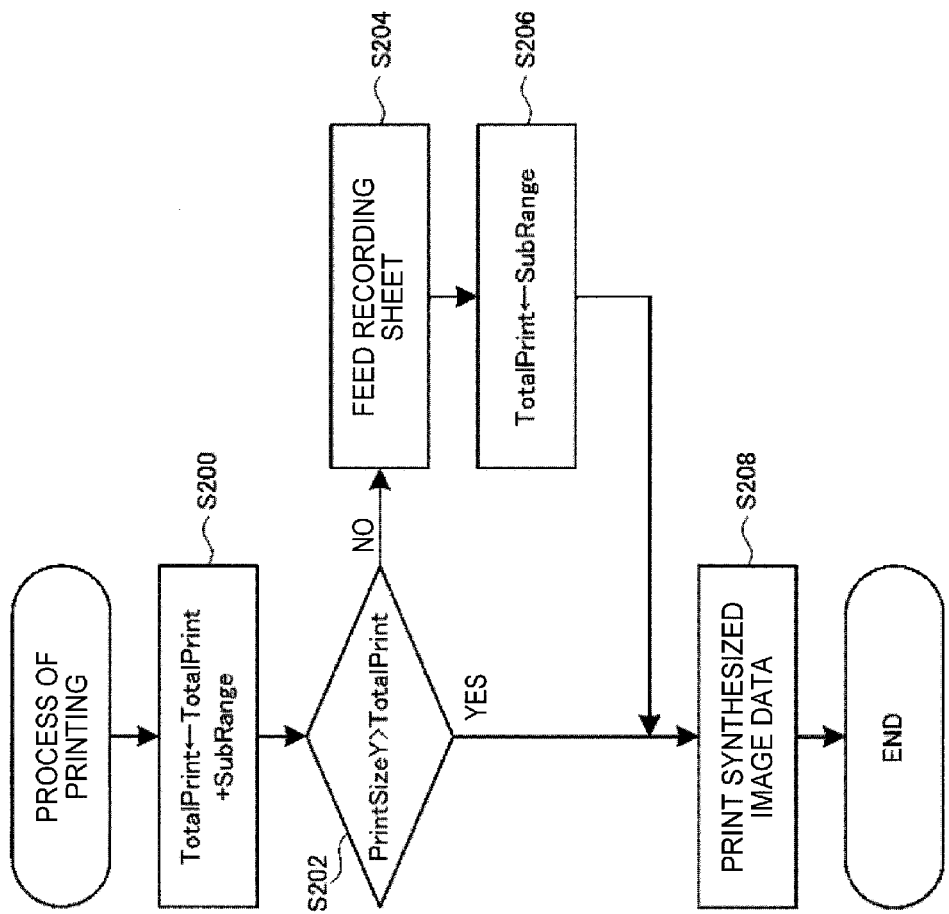
FIG. 5 is a flowchart of a process of printing in accordance with one or more aspects.

The process of printing executed in S136 of the process of printing a synthesized image illustrated in FIGS. 2A and 2B will be described with reference to FIG. 5. The CPU 210 which started the process of printing adds the Subrange set in either S122, S128 or S134 of in FIG. 2B to a total print (TotalPrint) and sets the new value obtained through the addition as a new TotalPrint (S200). The TotalPrint is a factor for management of the size of an image printed in a process of printing a synthesized image (i.e., a size of the recording sheet in the conveyance direction). In S136 of the process of printing a synthesized image illustrated in FIG. 2B, if the process of printing is executed for the first time, "0" has been set to the TotalPrint as an initial value and the CPU 210 adds the Subrange to the same. If, on the contrary, the process of printing is to be executed for the second time or later, the value of the TotalPrint set in S200 of the last process of printing has been set and the CPU 210 adds the Subrange to the TotalPrint.

In S202, the CPU 210 determines a relationship between the TotalPrint and the y direction size of the printing area of the recording sheet input by the user before the starting of the process of printing a synthesized image. In particular, the CPU 210 determines whether the y direction size of the printing area of the recording sheet is greater than the TotalPrint (i.e., whether the TotalPrint is smaller than the y direction size of the printing area of the recording sheet). If it is determined that the y direction size of the printing area of the recording sheet is greater than the TotalPrint (S202: affirmative), the routine proceeds to S208. If, on the other hand, the y direction size of the printing area of the recording sheet is smaller than the TotalPrint (S202: negative), the routine proceeds to S204.

In S204, the CPU 210 feeds a new recording sheet to the printing section 250. The CPU 210 then sets the TotalPrint as the Subrange set in either S122, S128 or S134 of FIG. 2B (S206) and the routine proceeds to S208. In S208, the CPU 210 instructs the printing section 250 to print the synthesized image data 290 generated in S120, S126 or S132 of FIG. 2B. If the determination result in S202 is affirmative (S202: affirmative), the synthesized image represented by the present synthesized image data 290 will be printed on a recording sheet on which a synthesized image has already been printed.

In S208, the synthesized image represented by the synthesized image data illustrated in either of FIG. 4A to FIG. 4C is printed on the recording sheet. When the synthesized image printed on the recording sheet is folded in two at a straight line section G1 (in the contact state) or a straight line section G2 (in the close state), the image represented by the image data 284 and the image represented by the image data 288 are of the same orientation. That is, when the image is cut at outer edges and is folded in two at the straight line section G1 or G2, orientations of the images of both the surfaces correspond to an actual driving license in either case of FIG. 4A to FIG. 4C. That is, the CPU 210 makes the image data 284 and 288 disposed to be of the same orientation in S106 of FIG. 2A, specifies the sides to provide such a relationship in S120, S126 and S132 of FIG. 2B and generates the synthesized image data 290. In one example of FIGS. 4A-4C, the G1 or G2 lines do not appear in the synthesized image data 290. In this example, the G1 or G2 lines are not printed on the recording sheet. In another example of FIGS. 4A-4C, the G1 or G2 lines are formed as part of the synthesized image data 290. In this latter example, the G1 or G2 lines aid a user in the folding of the recording sheet.

Modified Embodiments

The present embodiment may also be configured in the following manner.

(1) Although the printing section 250 is an inkjet printing section in the foregoing description, the printing section 250 may alternatively be a laser printing section. With the laser printing section, in order to generate multiple pieces of synthesized image data 290 (i.e., when number N is not smaller than 2), the CPU 210 generates the synthesized image data 290 in a size that falls within the size of the printing area of the recording sheet input by the user and then executes S208 of the process of printing illustrated in FIG. 5 on the formed synthesized image.

Figure 2A:
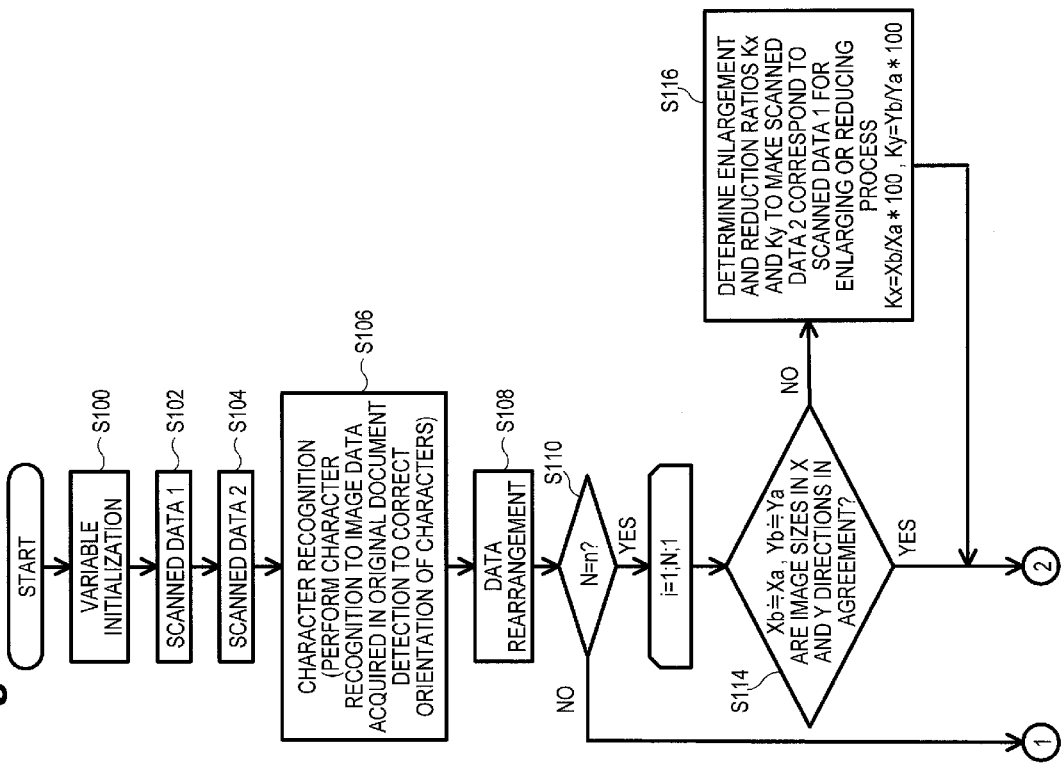
FIGS. 2A and 2B are flowcharts of a process of printing a synthesized image in accordance with one or more aspects.

(2) In the foregoing description, character recognition is performed in S106 of the process of printing a synthesized image illustrated in FIG. 2A and the turning upside down process is executed for the image data 284 and 288 on the basis of the orientation of the recognized characters. Here, a predetermined image process may be executed on an image including no characters and the turning upside down process may be executed only for the image data 284 and 288 disposed upside down based on a recognition of graphical shapes (for example, triangles, rectangles, lines, and the like) and/or the combination or placement of the graphical shapes in relation to the shape of the image data 284 and 288. Orientations of the images represented by the image data 284 and 288 may be recognized and, when both the images are disposed in different orientations, the turning upside down process may be executed only for one of the image data 284 and 288. Alternatively, if no recognized characters are present in one of the image data 284 and 288, then the turning upside down process may be skipped.

(3) In the foregoing description, the enlarging or reducing process is executed in S116 of the process of printing a synthesized image illustrated in FIG. 2A in order to make the image size (Xa, Ya) (see FIG. 3A) of the image data 288 generated in S104 correspond to the image size (Xb, Yb) (see FIG. 3B) of the image data 284 generated in S102. Alternatively, the image size (Xb, Yb) (see FIG. 3B) of the image data 284 generated in S102 may be made to correspond to image size (Xa, Ya) (see FIG. 3A) of the image data 288 generated in S104. In this case, the enlargement and reduction ratio K'x (%) in x direction is K'x=Xa/Xb×100 and the enlargement and reduction ratio K'y (%) in y direction is K'y=Ya/Yb×100. The CPU 210 enlarges or reduces the image data 284 in x direction at the ratio of K'x (%) and in y direction at the ratio of K'y (%) so that the image data 284 has the same image size (Xa, Ya) as that of the image data 288. With this modified embodiment (3), the CPU 210 determines in S118, S124 and S130 of FIG. 2B on the basis of the x direction size Xa of the image data 288.

Figure 2B:
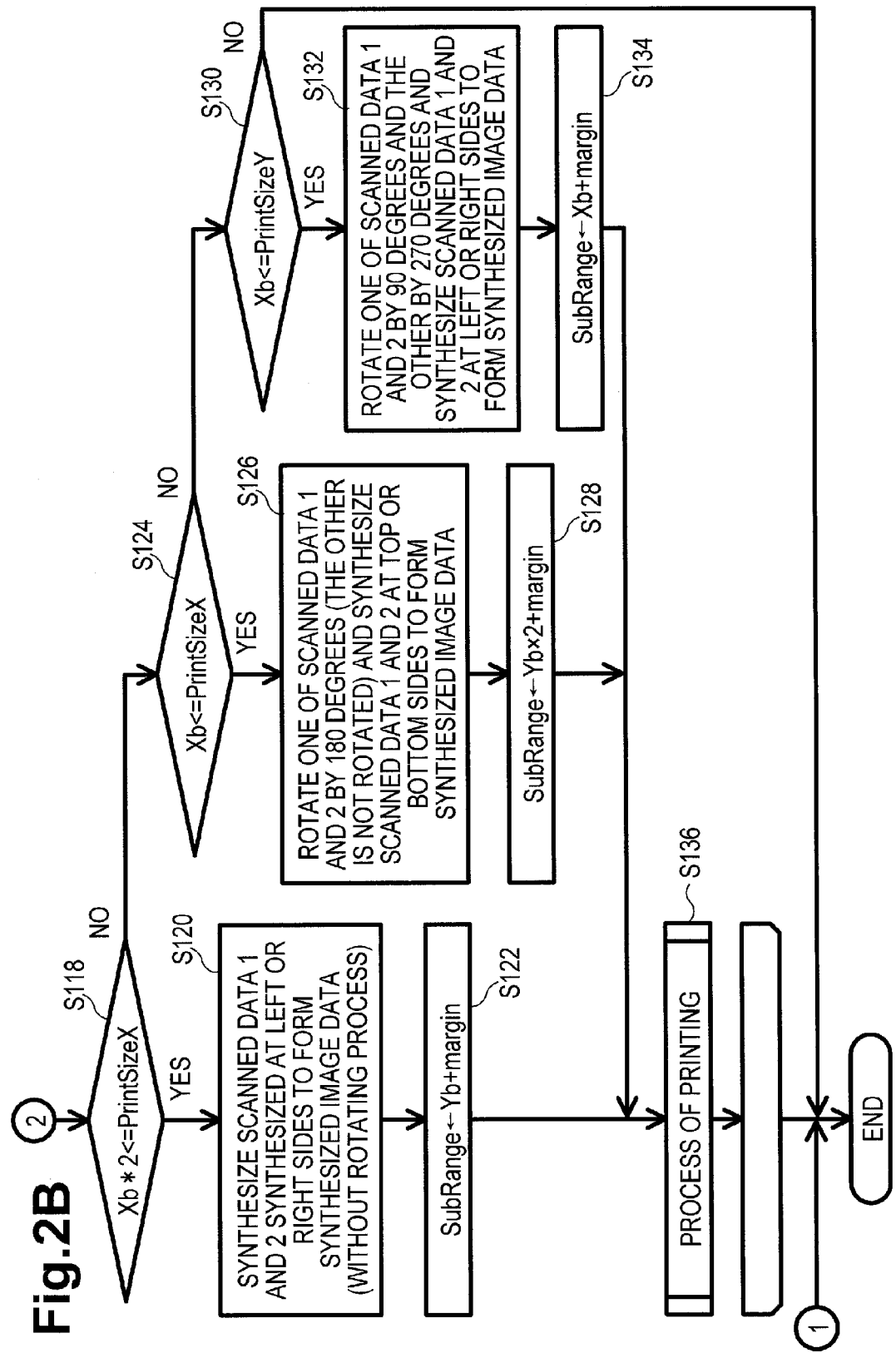

(4) In the foregoing description, the CPU 210 of the image forming apparatus 200 executes the process relating to the synthesis of the image data 284 and 288 (see S106 to S134 of FIGS. 2A and 2B). Alternatively, the computer 300 may communicate with the image forming apparatus 200 to obtain the image data 284 and 288 generated by the image forming apparatus 200 and execute the process relating to the synthesis of the image data 284 and 288 on the obtained image data 284 and 288 (see S106 to S134 of FIGS. 2A and 2B) to generate the synthesized image data 290. The computer 300 may then instruct the image forming apparatus 200 to print the generated synthesized image data 290. In this case, the CPU 310 executes the computer program 342 stored in the storage section 340 to execute the above-described process. The CPU 210 of the image forming apparatus 200 executes the process of printing of the synthesized image data 290 generated by the computer 300 (see S136 of FIG. 2B) and prints the synthesized image represented by the synthesized image data 290 on a recording sheet. Further, the computer 300 may receive image data 284 and 288 from another image source (for instance, a separate camera or another scanner) and then process the received image data as described above.

While the invention has been described connection with various exemplary structures and illustrative embodiments, it will be understood by those skilled in the art that other variations and modifications of the structures and embodiments describes above may be made without departing from the scope of the invention. Other structures and embodiments will be apparent to those skilled in the art from a construction of the specification or practice of the invention disclosed herein. It is intended that the specification and described examples are illustrative with the true scope of the invention being defined by the following claims.

What is claimed is:

1. An image forming apparatus comprising:
a scanning unit configured to read a first image, generate first image data representing the first image, read a second image, and generate second image data representing the second image;
a processor;
memory storing instructions that, when executed, cause the image forming apparatus to:
generate synthesized image data representing a synthesized image of the first and second images arranged in one of: a contact state where a first side which is one of four sides constituting an outer edge of the first image and a second side which is one of four sides constituting an outer edge of the second image are disposed immediately adjacent to each other, and a non-contact state in which the first and second sides are disposed parallel to and adjacent to each other with a space therebetween;
compare a size in a first axial direction of the synthesized image with the size of a printing area in the first axial direction of an effective printing area of a recording medium; and
in response to determining that the size of the synthesized image in the first axial direction is larger than the size of the printing area in the first axial direction, change an arrangement between the first and second images to generate modified synthesized image data representing a modified synthesized image in which another one of the four sides of the first image perpendicular to the first side and another one of the four sides of the second image perpendicular to the second side are disposed in one of: a contact state where the other one of the four sides of the first image and the other one of the four sides of the second image are disposed immediately adjacent to each other, and a non-contact state in which the other one of the four sides of the first image and the other one of the four sides of the second image are disposed parallel to and adjacent to each other with a space therebetween; and
a printing unit configured to print, on the recording medium, one of the synthesized image and the modified synthesized image.

2. The image forming apparatus according to claim 1,
wherein the second image has an up and down orientation, and
wherein the instructions, when executed, further cause the image forming apparatus to:
determine the up and down orientation of the second image represented by the second image data generated by the scanning unit; and
process the second image data to turn the second image to an opposite up and down orientation upon determining that the up and down orientation of the second image is upside down,
wherein generating the synthesized image data is performed using the second image data in the opposite up and down orientation.

3. The image forming apparatus according to claim 2, wherein:
the second image includes characters; and
the instructions, when executed, further cause the image forming apparatus:
execute a character recognition process for the second image data; and
determine the up and down orientation of the second image represented by the second image data on the basis of the orientation of characters recognized in the character recognition process.

4. The image forming apparatus according to claim 1, wherein the instructions, when executed, further cause the image forming apparatus to process the second image data to make sizes of the first and second sides substantially correspond to each other when sizes of the images represented by the first and second image data differ from each other, and
wherein generating the synthesized image data is performed using the enlarged or reduced second image data.

5. The image forming apparatus according to claim 1, wherein:
the first and second images each have an orientation; and
when the synthesized image is folded in two at a straight line section corresponding to or parallel to the first and second sides with the synthesized image being printed by the printing unit on a recording medium, the image data synthesizing unit specifies the first side and the second side such that the first image constituting a part of the synthesized image and the second image constituting a part of another synthesized image are of the same orientation.

6. The image forming apparatus according to claim 1, wherein the scanning unit comprising a reading sensor,
wherein the scanning unit is configured to:
operate the reading sensor to read the first image and the second image, where the first image is from a first side of a first medium and the second image is from a first side of a second medium, where the first medium and the second medium are arranged relative to each other; and
operate the reading sensor to read a third image and a fourth image, where the third image is from a second side of the first medium and the fourth image is from a second side of the second medium; and
wherein the instructions, when executed, further cause the image forming apparatus to:
based on a relative arrangement of the first and second media during the reading of the first and second images and a relative arrangement of the first and second media during the reading of the third and fourth images, determine a first combination of the first image and the third image and a second combination of the second image and the fourth image, and
generate the synthesized image and another synthesized image based on the determined first combination and the determined second combination.

7. The image forming apparatus according to claim 6, wherein the reading sensor is configured to move in a first direction, and
wherein the first medium and the second medium are separated from each other in a second direction perpendicular to the first direction.

8. The image forming apparatus according to claim 6, further comprising:
a document positioning device configured to position the first and second media when the scanning unit reads the first and second images, respectively.

9. The image forming apparatus according to claim 8, wherein the document positioning device is a document table.

10. The image forming apparatus according to claim 8, wherein the document positioning device is a drive mechanism.

11. The image forming apparatus according to claim 1, wherein the first image is on a first medium and the second image is on a second medium.

12. The image forming apparatus according to claim 1, wherein the first image is on a first surface of a first medium and the second image is on a second surface of the first medium.

13. A non-transitory computer-readable medium having computer readable instructions for controlling an image forming apparatus which includes a scanning unit for reading an image on a medium to be read and generating image data representing the image and a printing unit for printing a predetermined image represented by predetermined data on a recording medium, the instructions causing the image forming apparatus to perform the steps of:
acquiring, using the scanning unit, first image data representing a first image and second image data representing a second image;
generate synthesized image data representing a synthesized image of the first and second images arranged in one of: a contact state where a first side which is one of four sides constituting an outer edge of the first image and a second side which is one of four sides constituting an outer edge of the second image are disposed immediately adjacent to each other, and a non-contact state in which the first and second sides are disposed parallel to and adjacent to each other with a space therebetween;
comparing a size in a first axial direction of the synthesized image with the size of a printing area in the first axial direction of an effective printing area of a recording medium;
in response to determining that the size of the synthesized image in the first axial direction is larger than the size of the printing area in the first axial direction, change an arrangement between the first and second images to generate modified synthesized image data representing a modified synthesized image in which another one of the four sides of the first image perpendicular to the first side and another one of the four sides of the second image perpendicular to the second side are disposed in one of: a contact state where the other one of the four sides of the first image and the other one of the four sides of the second image are disposed immediately adjacent to each other, and a non-contact state in which the other one of the four sides of the first image and the other one of the four sides of the second image are disposed parallel to and adjacent to each other with a space therebetween; and
instructing the image forming apparatus to print one of: the synthesized image and the modified synthesized image.

14. An image forming apparatus comprising:
a scanning unit comprising a reading sensor, the scanning unit configured to:
operate the reading sensor to read a first image and a second image, wherein the first image is from a first side of a first medium and the second image is from a first side of a second medium, where the first medium and the second medium are arranged relative to each other;
generate first image data representing the first image;
generate second image data representing the second image; and
operate the reading sensor to read a third image and a fourth image, wherein the third image is from a second side of the first medium and the fourth image is from a second side of the second medium;
a processor;
memory storing instructions that, when executed by the processor, cause the image forming apparatus to:
based on a relative arrangement of the first and second media during the reading of the first and second images and a relative arrangement of the first and second media during the reading of the third and fourth images, determine a first combination of the first image and the third image and a second combination of the second image and the fourth image;
based on the determined first combination, generate synthesized image data representing a synthesized image of the first and third images arranged in one of: a contact state where a first side which is one of four sides constituting an outer edge of the first image and a second side which is one of four sides constituting an outer edge of the third image are disposed immediately adjacent to each other, and a non-contact state in which the first side which is the one of the four sides constituting the outer edge of the first image and the second side which is the one of the four sides constituting the outer edge of the third image are disposed parallel to and adjacent to each other with a space therebetween; and
based on the determined second combination, generate other synthesized image data representing a synthesized image of the second and fourth images arranged in one of: a contact state where a first side which is one of four sides constituting an outer edge of the second image and a second side which is one of four sides constituting an outer edge of the fourth image are disposed immediately adjacent to each other, and a non-contact state in which the first side which is the one of the four sides constituting the outer edge of the second image and the second side which is the one of the four sides constituting the outer edge of the fourth image are disposed parallel to and adjacent to each other with a space therebetween; and
a printing unit configured to print, on a recording medium, one of: the synthesized image of the first and third images and the synthesized image of the second and fourth images.

* * * * *

UNITED STATES PATENT AND TRADEMARK OFFICE
CERTIFICATE OF CORRECTION

PATENT NO.        : 8,564,843 B2                                            Page 1 of 1
APPLICATION NO.   : 12/877643
DATED             : October 22, 2013
INVENTOR(S)       : Taichiro Kimoto It is certified that error appears in the above-identified patent and that said Letters Patent is hereby corrected as shown below:

In the Claims

In Column 12, Claim 3, Line 20:
   Please delete "apparatus" and replace with --apparatus to--

Signed and Sealed this
Twenty-fourth Day of November, 2015

Michelle K. Lee
*Director of the United States Patent and Trademark Office*